United States Patent [19]
Underwood

[11] 3,862,624
[45] Jan. 28, 1975

[54] OXYGEN-HYDROGEN FUEL USE FOR COMBUSTION ENGINES

[76] Inventor: Patrick Lee Underwood, 13285 Dyer St., Sylmar, Calif. 91342

[22] Filed: Apr. 6, 1973

[21] Appl. No.: 348,503

Related U.S. Application Data

[63] Continuation-in-part of Ser. No. 79,475, Oct. 10, 1970.

[52] U.S. Cl.... 123/119 A, 123/DIG. 12, 123/119 B, 123/120, 60/39
[51] Int. Cl............................................. F02m 25/06
[58] Field of Search..... 123/DIG. 12, 119 A, 119 E, 123/119 B, 120; 60/39–46

[56] References Cited
UNITED STATES PATENTS

| | | | |
|---|---|---|---|
| 883,240 | 3/1908 | Sabathe | 123/119 E |
| 1,275,481 | 8/1918 | Seymour, Jr. | 123/119 E |
| 1,750,919 | 3/1930 | Becker | 123/119 A |
| 2,478,682 | 8/1949 | Blackwood | 123/119 A |
| 2,742,885 | 4/1956 | Thwaites et al. | 123/119 A |
| 3,101,592 | 8/1963 | Robertson et al. | 123/DIG. 12 |
| 3,362,386 | 1/1968 | McMahon | 123/119 B |
| 3,362,883 | 1/1968 | Wright | 123/DIG. 12 |
| 3,559,402 | 2/1971 | Stone et al. | 60/39.46 X |
| 3,608,529 | 9/1971 | Smith et al. | 123/DIG. 12 |
| 3,672,341 | 6/1972 | Smith et al. | 123/DIG. 12 |

FOREIGN PATENTS OR APPLICATIONS

| | | | |
|---|---|---|---|
| 736,486 | 5/1943 | Germany | 123/119 E |
| 831,429 | 9/1938 | France | 123/119 E |

*Primary Examiner*—Wendell E. Burns

[57] ABSTRACT

A combustion engine which uses in combination oxygen and an excess of hydrogen as fuel has a substantially closed exhaust system which recirculates the gaseous part of the exhaust through the engine and expels only water. Hot engine exhaust is cooled by heat exchange contact with supplies of oxygen and hydrogen and the oxygen and hydrogen are simultaneously warmed by the exchange of heat. A trap separates water from the excess hydrogen, and the excess hydrogen and blowby exhaust from the engine are mixed with fresh supplies of oxygen and hydrogen before the mixture is injected into the engine for combustion.

Throttle valves are adjusted to vary the quantity of oxygen and hydrogen for speed control and at the same time maintain a proper proportioning of the gases at whatever quantity flow may be established for a selected speed.

10 Claims, 5 Drawing Figures

INVENTOR.
PATRICK LEE UNDERWOOD
By
Beehler & Arant
ATTORNEYS.

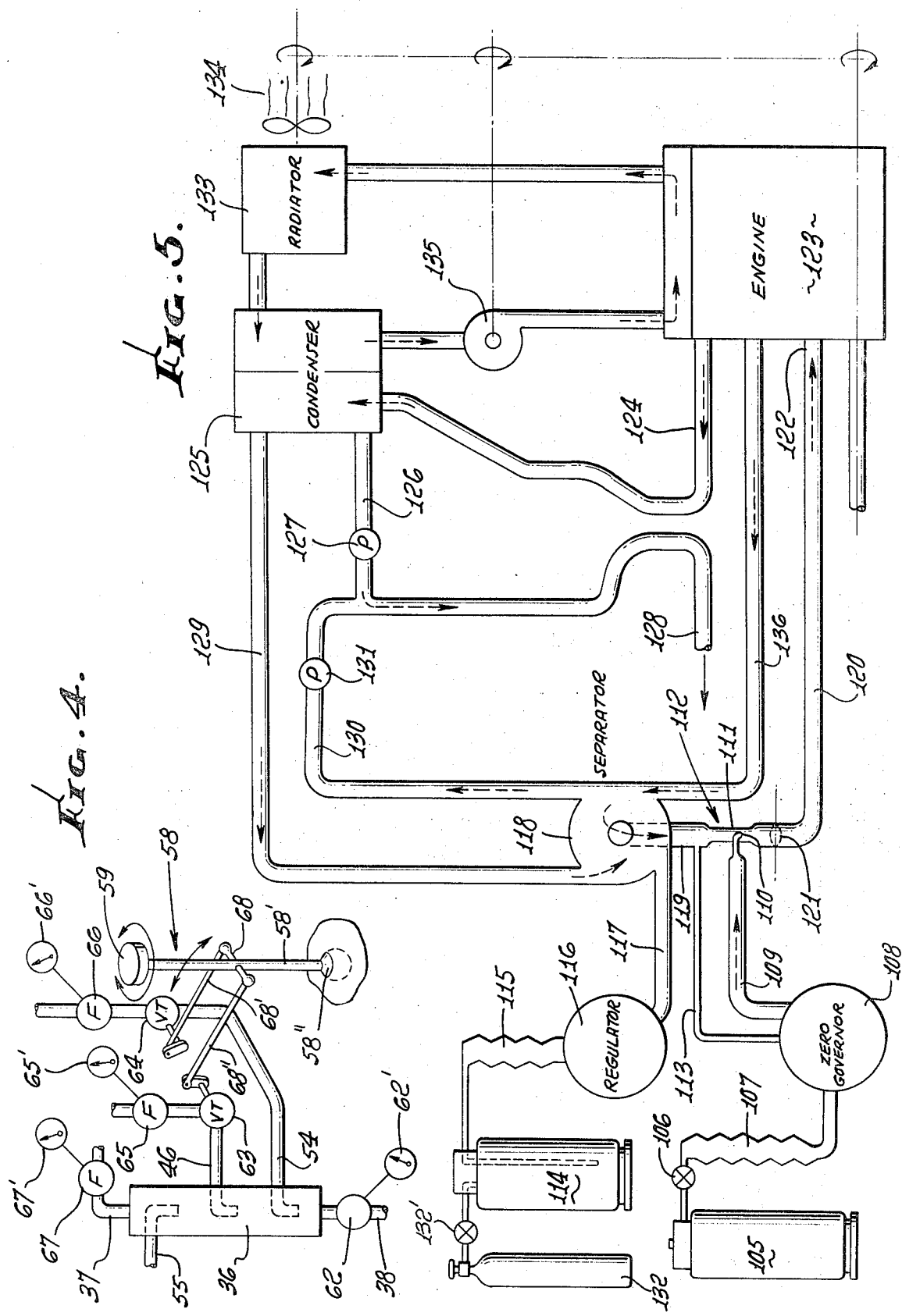

OXYGEN-HYDROGEN FUEL USE FOR COMBUSTION ENGINES

This is a continuation-in-part of the copending application, Ser. No. 79,475, filed Oct. 10, 1970. su The object of the invention is to eliminate completely all pollutants from the system exhaust of a conventional internal combustion engine without the necessity of modifying the basic engine design.

Exhaust pollutants from internal combustion engines fueled by hydrocarbons and using air as an oxidizer consist of fuels not fully oxidized, oxides of nitrogen, carbon monoxide and various chemicals formed in the cylinder by reaction of the fuel additives with the oxygen and nitrogen of the air within the high presssure, high temperature and electric arc presence in the environment of the normal otto cycle engine common to current automotive propulsion systems. Although carbon dioxide is produced by humans and animals, internal combustion engines fueled by hydrocarbons produce carbon dioxide at a sufficiently great rate to b considered a pollutant. Although some water is alsso produced by engines fueled by hydrocarbons water is not generally considered a pollutant.

In the invention here disclosed, hydrogen and oxygen are used as fuel so that water is the only product of combustion and thus is not a pollutant by any definition. In this example, removal of water is accomplished by taking the engine exhaust, consisting of water vapor, hydrogen and miscellaneous inert gases and partially or fully oxidized elements, and passing the mixture through a condenser next to a separator to remove the liquid water and then returning the remaining gaseous portion of the mixture to the intake manifold of the engine. The separated water may be collected in a reservoir, or may be exhausted from the system directly in the liquid state.

The miscellaneous returned gases are mixed with a quantity of hydrogen sufficient to regulate the engine speed. The blowby gases from the engine crankcase, consisting mostly of hydrogen but having some oxygen, water vapor, lubricating oil vapor and miscellaneous other substances, and sufficient oxygen to oxidize an amount of the hydrogen provided for engine speed control are added to the mixture. This mixture is then introduced into the engine intake manifold for normal combustion and subsequent exhausting from the engine to complete the recirculation cycle. Miscellaneous gases referred to in this foregoing description can be an inert gaseous component, hydrogen only, oxides of nitrogen, carbon dioxide, or other combination of gases suitable to retard the flame speed and to provide an expansion medium when the engine is not operating at full throttle.

Among the objects of the invention is to provide a new and improved fuel cycle for an internal combustion engine which will substantially eliminate exhaust of substances commonly identified as atmosphere pollutants.

Still another object of the invention is to provide a new and improved fuel system for an internal combustion engine in which the only exhausted component is water.

Still another object of the invention is to provide a new and improved fuel system for an internal combustion engine which improves the quietness of operation of the engine, which eliminates the need for muffler and carburetor and which, when fueled with hydrogen, avoids the formation of engine oil acid.

Additionally included among the objects of the invention is to provide a new and improved fuel system for a combustion engine wherein, by use of hydrogen and oxygeen in liquid state as a source of energy, makes possible employment of the system as a cooling expedient to take the place of the conventional air-conditioning device, and provide a cooling air conditioner for such vehicle as may be operated by use of the system.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 4 is a manual control for operation of all forms of the invention.

FIG. 5 is another form of the invention showing a different means for controlling engine speed.

Figure 1:
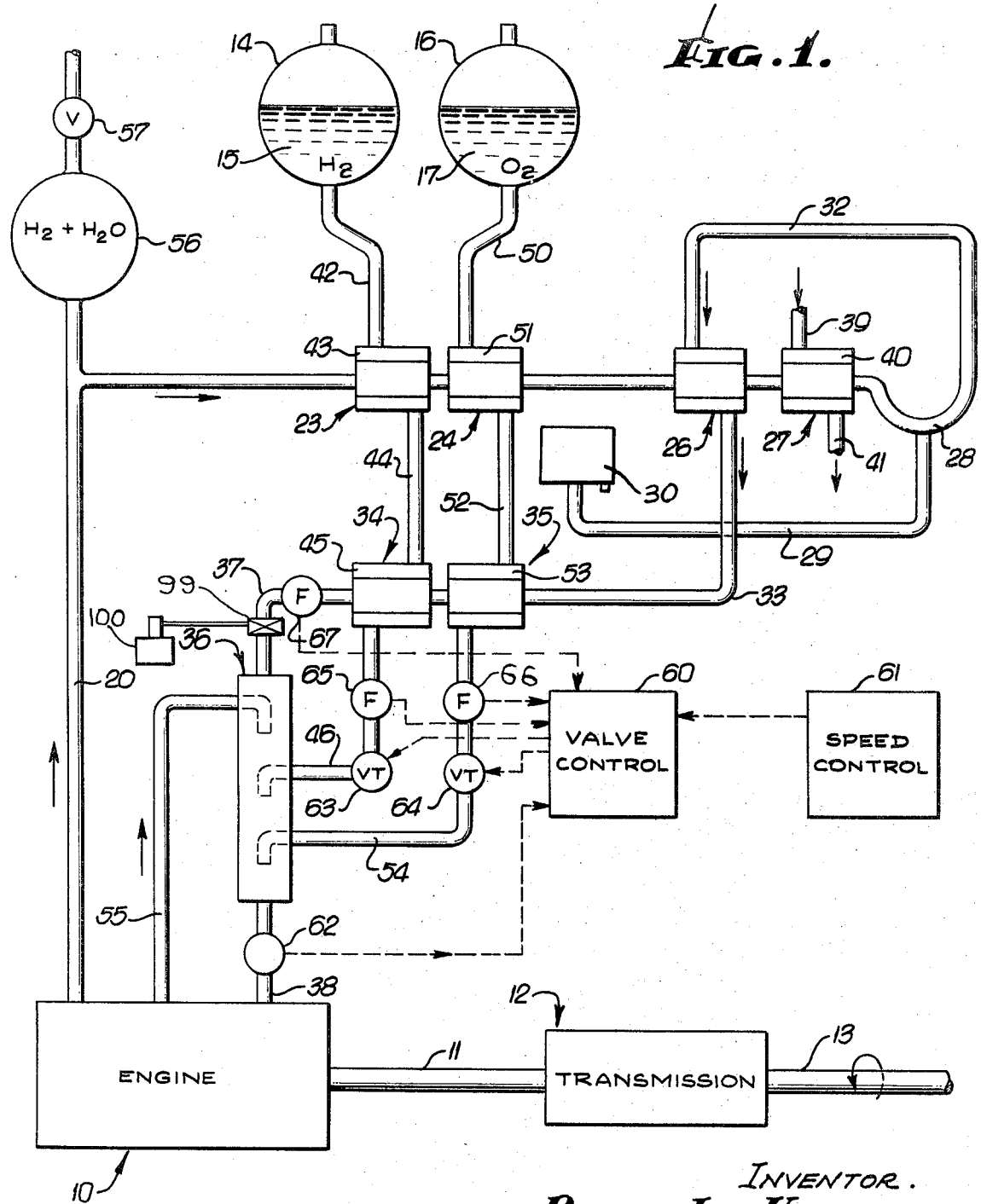
FIG. 1 is a schematic representation of one form of the fuel system which contemplates employment of hydrogen and oxygen in liquid state.

In one embodiment of the invention chosen for the purpose of illustration there is shown a substantially conventional combustion engine indicated generally by the reference character 10 which, acting through a shaft 11 and transmission 12, is adapted to operate a drive shaft 13.

Fuel for the engine is contained in a reservoir 14 adapted to contain a quantity 15 of liquid hydrogen and a reservoir 16 adapted to contain a quantity of liquid oxygen 17.

Inasmuch as recirculation of the engine exhaust is an important phase of the system attention is initially directed to an engine exhaust line 20 and its extension 21 which is served by a series of heat exchangers 23, 24, 26, and 27 at the end of which is a water separating device in the form of a trap 28. Inasmuch as the fuel for the engine is a mixture of oxygen and hydrogen the principle ingredient of the exhaust is water which, in view of the series of heat exchangers, has been converted to liquid and which, by operation of the trap 28, is separated out passing through an exhaust liquid line 29 and deposited into a reservoir 30.

Since the system is designed and adapted to operate with a surplus of a selected gaseous ingredient which is part of the engine exhaust mixture, a surplus gas return 32 leading from the trap 28 passes through the outer jacket of the heat exchanger 26 on its way to a pipe 33 and ultimately back to the engine 10.

More specifically the pipe 33 is directed through two additional heat exchangers 34 and 35 and then enters a mixer 36 by way of a pipe 37. An intake manifold 38 receives fuel gas from a pipe 38' at the outlet of the mixer and passes it to the engine 10.

The heat exchanger 27, serving as a condenser and previously identified as being located in the extension 21 of the exhaust line, may be a substantially conventional heat exchanger such for example as a radiator of the type commonly used on automotive vehicles, capable of circulating cooling water through an inlet 39 and then around a jacket 40 to an outlet 41.

Since liquid hydrogen and liquid oxygen respectively in the reservoirs 14 and 16 tend to emerge in cold condition from the reservoirs, it is desirable to warm these fuels before they reach the mixer 36 and are injected into the engine. To accomplish this, a pipe 42 from the oxygen reservoir 14 communicates with a jacket 43 of the heat exchanger 23 and is warmed by the heat of the engine exhaust. A pipe 44 from the jacket 43 communicates with a jacket 45 of the heat exchanger 34 where the hydrogen is warmed additionally by heat which remains present in the surplus gas returning through pipe 33, action of the heat exchangers 23 and 34 thereby serving to convert liquid hydrogen into gaseous hydrogen before it passes through a supply pipe 46 to the mixer 36.

Similarly, a pipe 50 from the oxygen reservoir 16 passes liquid oxygen to a jacket 51 of the heat exchanger 24 from which is flows through a pipe 52, converted into gaseous form, to a jacket 53 of the heat exchanger 35. From the jacket 34 oxygen passes through a supply pipe 54 on its way to the mixer 36 and ultimately to the engine 10.

To complete the circuit there is provided a blowby exhaust line 55 which accepts exhaust from the crankcase of the engine and passes it to the mixer 36. It follows therefore that the mixer 36 receives gaseous components from several different sources, namely the blowby exhaust, the surplus gas return, and the fresh fuel supplies of oxygen and hydrogen wherein all are mixed before being returned to the inlet side of the combustion engine.

In the engine exhaust line 20 is an accummulator 56 equipped with a relief valve 57 to prevent over-pressuring of the system.

Because of inherent differences in flow rates of hydrogen and oxygen upon changes in demand, it is advantageous to make use of an automatic valve control 60 responsive jointly to a speed control 61 and a pressure gauge 62 at the intake manifold in controlling throttle valves 63 and 64 respectively in the hydrogen supply pipe 46 and oxygen supply pipe 54, thereby to control the quantity of oxygen fuel and make up hydrogen being introduced to the mixer 36 and, in consequence, to control the speed of the engine. The speed control may, if desired, be entirely manual.

Flow meters 63 and 64 respectively in the same hydrogen supply line 46 and oxygen supply line 54 are connected respectively to the automatic valve control 60. A flow meter 67 in the pipe 37 returning surplus gas to the mixer 36 is similarly connected.

The flow meters 65, 66, and 67, of conventional construction, provide the valve control with information indicating the rate of flow in the respective pipes. Related information is provided by the pressure gauge 62 to the flow meter giving pressure at the intake manifold. By a conventional integrating system, not part of the present invention, the valve control 60, when activated by the speed control 61 at the volition of the operator, mechanically operates the flow controls 63 and 64 in either an opening direction for speed up of the system or in a closing direction for lessening speed. Equivalent operation can be achieved by manual manipulation of the flow controls directly by the speed control.

As operation of the circuit progresses the engine exhaust is partially cooled by action of the heat exchangers 23, 24, and 26 before reaching the heat exchanger 27 and the trap 28, the trap 28 being designed to prevent excape of the surplus gas from the system. On those occasions where the surplus gas is hydrogen the trap will separate hydrogen into the water which is the product of the combination of two parts hydrogen and one part oxygen made use of as the explosive mixture to operate the engine.

A substantial excess of hydrogen is made use of which may be ninety-two parts by volume over and above the quantity of hydrogen necessary for combustion. When the surplus gas, which in the present example is surplus hydrogen, passes through the heat exchangers 34 and 35, the surplus gas will be brought to substantially the temperature of the fuel and oxidizer which in the present example is hydrogen and oxygen, before all, by their separate supply pipes, are passed to the mixer 36.

The purpose of the flow meters 65, 66, and 67 is to provide information to the valve control 60 to maintain proper net volumetric supply ratio of two parts of hydrogen to one part of oxygen for proper combustion. During the acceleration mode, excess hydrogen and water vapor are stored in the accumulator 56 until constant speed is reached, or the deceleration mode has started. The relief valve 57 will vent excess pressures developed in the accumulator by system operation as has been previously noted.

As an example of manual control of the quantity of oxygen and hydrogen to the manifold to change engine speed reference is made to FIG. 4. As there shown a battery of indicators reveal visually the flow conditions at various locations at any given instant. An indicator 67' is connected to the flow meter 67, an indicator 65' to the flow meter 65 and an indicator 66' to the flow meter 66. Where further flow information can be made use of an indicator 62' may be provided connected to the pressure gage 62.

A speed control throttle lever 58 has an arm 58' on a universal mounting 50''. A cross bar 68 has one end attached to a link 68' for manipulation of the throttle valve 64 for oxygen and the other end attached to a link 68'' for manipulation of the throttle valve 63 for hydrogen. A handle 59 on the arm 58' may be thrown forewardly or rearwardly to open or close both throttle valves simultaneously thereby to alter the speed of the engine. At the same time the handle 59 may be rotated to vary the relative openings or closings of the throttle valves.

Because of the different molecular weights of oxygen and hydrogen, flow rates vary with respect to each other depending on demand for quantity of the respective gases. Hence for higher speeds, by way of example, a greater quantity of both gases will be needed but at the proportionate quantities of freshly supplied gases. The proportion must remain at a ratio of two parts oxygen to one part hydrogen as delivered to the intake manifold 38. Because of the fact that when subject to greater demand the flow rates vary, the amount of opening of the control throttle 63 relative to the amount of opening in the control throttle 64 needs to be changed slightly.

As a guide to the operator in adjusting the manual settings the indicators 66', 65' and 67' respectively constantly supply a visable indication of flow in the oxygen and hydrogen in the supply lines 52 and 44 respectively, and also flow in the surplus gas return line 37. As a safety feature the indicator 62' shows the flow condition at the manifold at a point where all gaseous components have been combined. This is a warning as to how rapidly or slowly changes in quantity flow, and accordingly speed control, should be made.

Although an additional surplus gas such as argon or one of the other suggested gases may be introduced initially into the system the selected surplus gas or surplus gas of any selected kind to the system may be added later.

Figure 2:
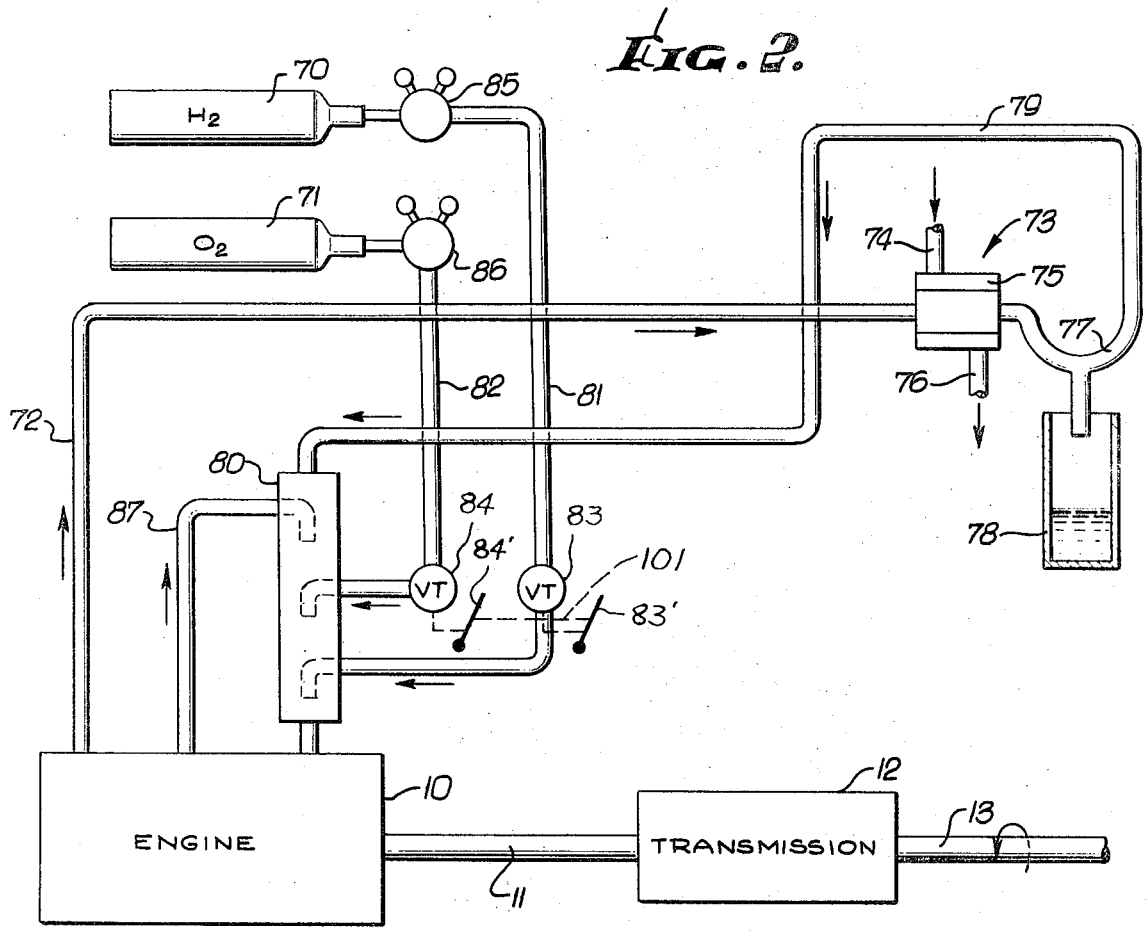
FIG. 2 is a schematic representation of a second form of the invention which makes use of oxygen and hydrogen as fuel in a compressed gaseous state.

Exhaust circuit illustrated in FIG. 2 a somewhat different arrangement is illustrated consisting of fewer components but in which the fuel hydrogen and oxidizer oxygen are stored respectively in pressure cylinders 70 and 71 in the compressed gas state. An engine exhaust line 72 conducts gaseous engine exhaust to a heat exchanger 73, operating on substantially conventional principles to cool the exhaust gases by a cooling liquid flowing from an inlet 74 to a jacket 75, and, thence, outwardly through an outlet 76. The cooling effect is made sufficient such that be the cooled exhaust gases reach a trap also the resulting water is separated out and dumped into a receiver 78 and the remaining surplus gas, passes through a surplus gas return line 79 for ultimate delivery to the combustion engine.

A mixer 80 receives the surplus gas from the surplus gas return line 79 and also receives hydrogen from the hydrogen supply line 81 and oxidizer namely oxygen from an oxygen supply line 82. The flow of hydrogen is controlled by means of a manual throttle valve 83 manipulated by a lever 83', oxygen being controlled by means of a manual throttle valve 84 manipulated by a lever 84', before being passed to the mixer 80. A hydrogen pressure regulator 85 controls hydrogen pressure to the supply line 81 and an oxygen pressure regulator 86 controls oxygen pressure to the supply line 82.

To complete the recirculation cycle a blowby exhaust line 87 takes exhaust from the engine crankcase and passes it to the mixer 80.

Oxygen and hydrogen in this form of the circuit being initially supplied as gases serve to minimize need for the numerous heat exchangers described in connection with the FIG. 1 circuit and the engine speed can therefore be more directly controlled by the throttle valves 83 and 84 linked in a conventional manner by linkage 101 which, in the event that the engine is an automotive engine, would be the driver of the vehicle.

Figure 3:
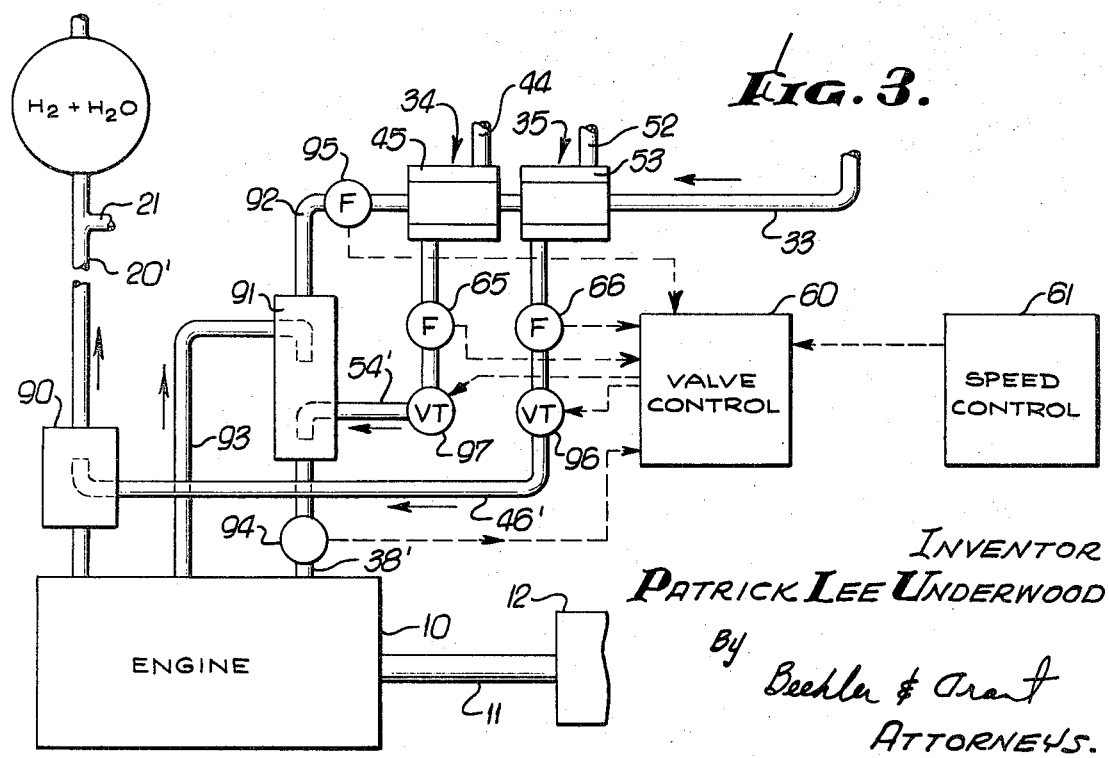
FIG. 3 is a schematic representation of a somewhat modified form of the invention illustrated in FIG. 1.

In still another modified form of the circuit as illustrated in FIG. 3 hydrogen from the hydrogen supply pipe 46' is conducted to an injector 90 in an engine exhaust line 20' in a manner such that hydrogen gas as fuel first flows from the engine exhaust line 20' to the extension 21 and thence through all of the heat exchangers 23, 24, 26, and 27 before passing into the engine intake manifold 38' from a modified mixer 91 by way of a pipe 92.

As previously described in connection with the forms of invention of both FIG. 1 and 2, blowby exhaust passes through a blowby exhaust line 93 to the modified mixer 91 where it mixes with the fuel gas, the oxidizer, and the surplus gas before being passed through a flow meter 94 to the intake manifold 38' an thence to the engine 10.

The flow meter 94 in the form of FIG. 3 is adapted to be controlled by the flow control 60, similar to the flow control 60 in FIG. 1, or by the manual control of FIG. 4.

In the form of device of FIG. 3 oxygen, after passing through the customary heat exchangers shown in connection with FIG. 1, is fed to the modified mixer 91 from an oxygen supply pipe 54'.

A flow meter 95 in the pipe 92 serves a purpose similar to that described for the flow meter 67 in FIG. 1. Throttle valves 96 and 97 respectively for hydrogen and oxygen, working through a valve control like the valve control 60 of FIG. 1 and speed control 61 of FIG. 1 serve to control the quantities of hydrogen and oxygen respectively fed to the engine and thereby control the speed.

Although an excess of hydrogen has been used in the description of the circuit and its operation, it should be understood that the surplus gas may be some other gaseous ingredient such as one of the inert gases like argon or a mixture of such gaseous elements. Under some circumstances air may be used as the surplus gas, or some other gas which will not take part in the oxygen-hydrogen combustion. To make it possible to inject surplus gas of any kind, there may be provided in the pipe 37 a conventional three-way valve 99 supplied by a container 100 which contains the desired additional surplus gas.

Proportions of the surplus gas may vary, typical examples productive of acceptable results being as follows:

| Example 1: | Oxygen 20% |
| | Hydrogen 80% |
| Example 2: | Oxygen 4% |
| | Hydrogen 96% |
| Example 3: | Oxygen 8% |
| | Hydrogen 92% |

The invention in the form illustrated in FIG. 5 exemplifies an alternative expedient for introducing oxygen under control to the system at a location such that the speed control of a standard internal combustion engine can be governed by a simple butterfly valve.

The system embodies a container 105 of liquid oxygen held preferably under a pressure of 80 pounds per square inch. Oxygen from the container passes to a conventional regulator 106 where the pressure is lowered to a pressure of 10 pounds per square inch at 70° Farenheit. From here the oxygen passes through a vaporizer 107 and then to a governor 108. From the governor oxygen passes through a supply line 109 to an aspirator 110 at the throat 111 of a venturi 112. A pressure reference line 113 provides a connection from the intake side of the venturi 112 to the governor 108.

In this form of the invention by way of example hydrogen in liquid form is supplied from a container 114 at 10 pounds per square inch pressure to a vaporizer 115 and then to a regulator 116. The purpose of the regulator is merely to be certain that the oxygen is at a pressure of about one-fourth pound per square inch higher than ambient. From the regulator hydrogen passes through a hydrogen supply line 117 to a separator 118, from which a pipe 119 passes the hydrogen to the entrance end of the venturi 112. Hydrogen mixing with oxygen in the throat of the venturi in a stoichiometric ratio passes to the outlet end of the venturi and then through a combined conduit 120 in which is located a conventional speed control of the butterfly type 121. From the conduit 120 the gaseous mixture flows to an intake 122 of a conventional combustion engine 123.

A conventional engine exhaust is exemplified by a combined passageway 124 from which the exhaust, which is a mixture of water in either steam or moist condition together with surplus hydrogen travels to a condenser 125 where the water is separated from the surplus hydrogen. Water is drawn through a pipe 126 by pump 127 and then passed through a discharge line 128 to atmosphere.

The surplus hydrogen, which is in appreciable volume, passes from the condenser 125 through a pipe 129 to the separator 118. The function of the separator is merely to extract any water which may remain present in the surplus hydrogen, such water as may be extracted being discharged through a pipe 130 by means of a pump 131 and from there passed to the discharge line 128 where it joins the water initially separated out by the condenser 125.

The surplus hydrogen from which the water has been extracted by the separator 118 passes to the pipe 119 which also receives fuel hydrogen from the hydrogen container 114.

To assist in discharging the hydrogen at the desired rate use may be made of a container 132 containing hellium at a storage pressure of 2,000 pounds per square inch which, when passing through a conventional regulator 132' is used to displace hydrogen in the hydrogen container 114, the hellium taking no part in the reaction nor in the system otherwise.

For operating the condenser 125 use is made of a conventional automobile radiator 133 from which a fan 134 draws air, a coolant pump 135 circulates coolant which may be water, over the condenser 125 to condense out the water as previously noted. The surplus coolant merely passes to the combustion engine for cooling in a purely conventional fashion.

Crankcase blowby vapors are carried through a blowby exhaust line 136 to the separator 118 and the blowby gas joins the surplus hydrogen as it emerges from the separator and as it is joined by the fuel hydrogen as previously described. Should there be any water vapor present in the blowby gases such water can be separated from the gases by operation of the separator 118.

Basically, the system of FIG. 5 operates in substantially the same fashion as has been described for FIG. 1 and the other forms of the invention. The expedient resorted to embodied in the venturi principle is one only of a variety of ways which can be employed to maintain a stoichiometric ratio of fuel oxygen and fuel hydrogen at different rates of flow, such rates being the result of manipulation of the speed control butterfly valve 121. It should be borne in mind that the principle of operation of the system namely maintenance of a super abundance of hydrogen as an excess gas is the principle of operation of the system of FIG. 5 as it is with the other systems, blowby is retained in the system as a closed system so that the only waste product of the system is water which is a non-atmospheric pollutant.

No special tailpipe is needed since the exhaust is not toxic. No muffler is needed because the exhaust sound level is low resulting in little more than a slight rushing sound.

Although a stoichiometric ratio is mentioned for introduction of fuel oxygen and fuel hydrogen, the salient feature of the system is there being maintained at all times what may aply be described as a super abundance of surplus of hydrogen gas, or possibly hydrogen mixed with some other inert gas, this surplus always being present throughout the system except in the supply lines of fuel oxygen and fuel hydrogen.

In all forms of the invention operation is begun in a substantially conventional fashion by cranking the engine thereby to create sufficient suction to draw the combustion fuel into the system where ignition is effected by spark plugs.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. In a piston and cylinder type combustion engine of the open cycle type having a conventional combustion stage intake and exhaust valving and a crankcase and including a combustion chamber, a fuel system comprising an engine fuel intake including a mixing passage and conduit means from said mixing passage to said combustion chamber, open exhaust means from the engine including said exhaust valving, a first source of gas comprising oxygen as fuel, a second source of gas comprising hydrogen as fuel, a supply line from the first source of gas to the mixing passage, a supply line from the second source of gas to the mixing passage, the quantity of gas of the type supplied from said second source when in said mixing passage at a location adjacent said conduit means therefrom being a surplus several times greater than the quantity of the gas from the first source of gas which is productive of a stoichiometric ratio with said gas from the first source of gas, a portion of the exhaust means from the engine comprising a combined passageway for surplus gas and water vapor from the engine, a water separating device in said passageway adapted to separate water of combustion from said surplus gas and including a discharge means for water open to the atmosphere, a heat exchanger in said combined passageway on the upstream side of said water separating device, and a gas return line for said surplus gas leading from said water separating device to said mixing passage whereby to maintain a surplus of said gas from said second source of gas in the engine at the combustion stage.

2. A fuel system as in claim 1 including a heat exchanger in said gas return line for said surplus gas at a location between said mixing chamber and said separating device.

3. A fuel system as in claim 1 wherein said exhaust means comprises one line communicating between said engine, said separating device and said mixing chamber and another line communicating between the crankcase of said engine and said mixing chamber.

4. A fuel system as in claim 1 wherein said oxygen fuel supply and said hydrogen fuel supply are in liquid form.

5. A fuel system as in claim 1 wherein the surplus gas is hydrogen.

6. A fuel system as in claim 1 wherein the surplus gas includes a substantially noble inert gas.

7. A fuel system as in claim 1 wherein there is a heat exchanger between the gas separated by said separating device and said exhaust means.

8. A fuel system as in claim 1 wherein there is a heat exchanger between the gas separated by said separating device and the supplies of oxygen and hydrogen fuel.

9. A fuel system as in claim 1 wherein there are heat exchangers between said exhaust means and said oxygen and hydrogen supply lines between said surplus gas derived from said separating device and said exhaust means, and between said surplus gas derived from said separating device and said oxygen and hydrogen supply lines.

10. A fuel system as in claim 1 wherein there is an accumulator having a relief valve therefore in communication with said exhaust means.

* * * * *